US009150221B2

(12) United States Patent
Sato et al.

(10) Patent No.: US 9,150,221 B2
(45) Date of Patent: Oct. 6, 2015

(54) VEHICLE CONTROLLER, CONTROL METHOD FOR VEHICLE AND CONTROL SYSTEM FOR VEHICLE

(75) Inventors: Yoh Sato, Miyoshi (JP); Yoshinori Kadowaki, Toyota (JP); Kazunori Kagawa, Nagoya (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 296 days.

(21) Appl. No.: 13/386,794

(22) PCT Filed: Jul. 29, 2009

(86) PCT No.: PCT/JP2009/063501
§ 371 (c)(1),
(2), (4) Date: Jan. 24, 2012

(87) PCT Pub. No.: WO2011/013216
PCT Pub. Date: Feb. 3, 2011

(65) Prior Publication Data
US 2012/0123659 A1    May 17, 2012

(51) Int. Cl.
*G08G 1/00* (2006.01)
*B60W 30/16* (2012.01)
*G08G 1/16* (2006.01)

(52) U.S. Cl.
CPC .............. *B60W 30/16* (2013.01); *G08G 1/163* (2013.01); *G08G 1/22* (2013.01); *B60W 2550/302* (2013.01); *B60W 2550/408* (2013.01)

(58) Field of Classification Search
CPC .................. B60W 2550/30; B60W 2550/308; G08G 1/22; G08G 1/163
See application file for complete search history.

(56) References Cited

U.S. PATENT DOCUMENTS

| 5,134,393 A * | 7/1992 | Henson ........................ 340/933 |
| 6,032,097 A | 2/2000 | Iihoshi et al. |

(Continued)

FOREIGN PATENT DOCUMENTS

| JP | 11 151953 | 6/1999 |
| JP | 11-250396 A | 9/1999 |

(Continued)

OTHER PUBLICATIONS

International Search Report Issued Nov. 2, 2009 in PCT/JP09/63501 Filed Jul. 29, 2009.

(Continued)

*Primary Examiner* — Khoi Tran
*Assistant Examiner* — Ryan Rink
(74) *Attorney, Agent, or Firm* — Oblon, McClelland, Maier & Neustadt, L.L.P.

(57) ABSTRACT

An ECU of a vehicle control device selects a system-mounted vehicle traveling ahead of a system-mounted vehicle as a cooperating vehicle and controls the inter-vehicle distance between the selected system-mounted vehicle and the system-mounted vehicle, or the like to control the traffic volume of a road in the vicinity of the system-mounted vehicles, such that traffic jams can be prevented effectively as compared with a case where the system-mounted vehicle performs travel control independently. Furthermore, the ECU determines whether or not to select the system-mounted vehicle as a cooperating vehicle based on the relative speed of the system-mounted vehicle and the system-mounted vehicle a regardless of whether or not the system-mounted vehicle that is selected as the cooperating vehicle is traveling in the same lane as the system-mounted vehicle, such that it is possible to select the cooperating system-mounted vehicle without being influenced by the accuracy of recognizing the lane in which the system-mounted vehicle travels.

9 Claims, 10 Drawing Sheets

(56) References Cited

U.S. PATENT DOCUMENTS

| | | |
|---|---|---|
| 6,289,278 B1 | 9/2001 | Endo et al. |
| 6,597,981 B2 | 7/2003 | Nishira et al. |
| 7,206,686 B2 | 4/2007 | Sawamoto et al. |
| 7,804,423 B2 | 9/2010 | Mudalige et al. |
| 7,860,639 B2 | 12/2010 | Yang |
| 8,185,300 B2 | 5/2012 | Miura et al. |
| 8,428,858 B2 | 4/2013 | Ishikawa et al. |
| 8,452,771 B2 | 5/2013 | Kurciska et al. |
| 2002/0059017 A1 | 5/2002 | Yamane et al. |
| 2002/0069010 A1 | 6/2002 | Nishira et al. |
| 2002/0176605 A1* | 11/2002 | Stafsudd et al. ............ 382/106 |
| 2004/0078133 A1* | 4/2004 | Miller et al. .................... 701/96 |
| 2004/0193372 A1* | 9/2004 | MacNeille et al. ........... 701/213 |
| 2004/0258064 A1* | 12/2004 | Nakamura et al. ........... 370/389 |
| 2006/0155427 A1 | 7/2006 | Yang |
| 2006/0195250 A1 | 8/2006 | Kawaguchi |
| 2007/0027610 A1* | 2/2007 | Parikh et al. .................. 701/117 |
| 2007/0083318 A1* | 4/2007 | Parikh ............................. 701/96 |
| 2007/0244614 A1* | 10/2007 | Nathanson ...................... 701/35 |
| 2009/0245247 A1* | 10/2009 | Nakamura et al. ........... 370/389 |
| 2012/0072089 A1 | 3/2012 | Nemoto et al. |
| 2012/0123660 A1 | 5/2012 | Kagawa et al. |
| 2012/0166059 A1 | 6/2012 | Aso |
| 2012/0239253 A1 | 9/2012 | Schmidt et al. |
| 2013/0080041 A1 | 3/2013 | Kumabe |
| 2013/0138320 A1 | 5/2013 | Aso |

FOREIGN PATENT DOCUMENTS

| | | |
|---|---|---|
| JP | 11 291791 | 10/1999 |
| JP | 2002 137652 | 5/2002 |
| JP | 2008-94167 A | 4/2008 |
| JP | 2008 232391 | 10/2008 |
| JP | 2011-70462 A | 4/2011 |
| WO | WO 2011/013202 A1 | 2/2011 |
| WO | WO 2011/013203 A1 | 2/2011 |

OTHER PUBLICATIONS

English translation of the International Preliminary Report on Patentability issued Mar. 15, 2012, in PCT/JP2009/063501.

Office Action mailed Jun. 21, 2013, in co-pending U.S. Appl. No. 13/387,284.

U.S. Notice of Allowance mailed Mar. 6, 2014 in U.S. Appl. No. 14/026,873.

Office Action issued on Jan. 13, 2014 in related U.S. Appl. No. 13/387,306.

Office Action mailed Oct. 25, 2013, in co-pending U.S. Appl. No. 14/026,873.

Office Action issued on Jun. 2, 2014 in U.S. Appl. No. 13/387,306.

Office Action mailed Sep. 18, 2014 in co-pending U.S. Appl. No. 13/387,306.

* cited by examiner

VEHICLE CONTROLLER, CONTROL METHOD FOR VEHICLE AND CONTROL SYSTEM FOR VEHICLE

TECHNICAL FIELD

The present invention relates to a vehicle control device, a vehicle control method, and a vehicle control system, and more particularly, to a vehicle control device, a vehicle control method, and a vehicle control system, which are configured to improve the traffic volume on a road.

BACKGROUND ART

In the related art, it has been attempted to mitigate traffic jams by improving the traffic volume on a load through controlling the travelling of individual vehicles. For example, Patent Literature 1 discloses a preceding vehicle follow-up device that detects changes in the inclination on the forward side of a traveled road, and in a case where the change in the inclination is detected in the vicinity of a sag (a point of change from downhill to uphill on the road) or the like on the forward side of the traveled road, switches from inter-vehicle distance control to vehicle speed control. The preceding vehicle follow-up device disclosed in Patent Literature 1, in the vicinity of a sag, is switched from inter-vehicle distance control to vehicle speed control to suppress a variation in vehicle speed during the preceding vehicle follow-up control. Particularly, in the preceding vehicle follow-up device described in Patent Literature 1, even when the inclination changes on a sag when a plurality of vehicles are traveling in a sequence, the preceding vehicle follow-up device prevents the variation in the vehicle speed of a preceding vehicle from being amplified and propagated to the following vehicles.

Citation List

Patent Literature

Patent Literature 1 Japanese Patent Application Laid-Open No. 2002-137652

SUMMARY OF INVENTION

Technical Problem

However, in the above-described technology, even when the preceding vehicle follow-up device is switched to the vehicle speed control in the vicinity of a sag, it is difficult to avoid a deceleration propagation in which deceleration of the preceding vehicle is propagated to the following vehicles. As a result, in a case where the vehicles travel in a sequence, the further back a vehicle is located, the larger the deceleration becomes. In addition, in the above-described technology, even though it is switched to the vehicle speed control in front of the sag, when the deceleration propagation occurs, there is a concern that the vehicle speed control is apt to return to the inter-vehicle distance control to prevent the inter-vehicle distance from becoming too close. In addition, in the above-described technology, the vehicle speed control is returned to the inter-vehicle distance control at a point of time when the deceleration propagation occurs, resulting in a traffic jam state where a plurality of vehicles travel slowly in a sequence, and therefore it is difficult to effectively suppress traffic jams.

Therefore, to suppress traffic jams more effectively, it is considered that a plurality of vehicles, instead of one vehicle only, which travel in the same lane and are equipped with the same system travel in cooperation with each other to suppress traffic jams. In this method, it is necessary to detect a separate vehicle which is in the same lane and equipped with the same system as a cooperating vehicle.

However, as a method of recognizing the lane in which the vehicle travels, a method of photographing a white line on the road using a vehicle mounted camera to recognize the lane is predominant. In this recognition of the white line using a camera, the detection rate greatly depends on the weather, time, and road conditions, therefore the detection ratio becomes low. For example, in the cases of rainy weather, night, a scratched white line, or the like, the recognition ratio of the while line decreases. In addition, in the recognition of the white line using a camera, it is difficult to recognize the white line at places such as intersection points and junction points where the state of the white line is different from an ordinary straight road. Therefore, in the recognition of the white line using a camera, the accuracy of recognizing a separate vehicle, which is in the same lane and equipped with the same system, is low.

In addition, a method may be considered where a separate vehicle which is in the same lane and equipped with the same system is detected using radar or the like. However, actually, a plurality of separate vehicles on which the system is not mounted may be present between system-mounted vehicles. In this case, it is difficult to directly irradiate the system-mounted vehicles with radar waves, such that it is difficult to detect the vehicles, which are in the same lane and equipped with the same system using the radar waves.

In addition, a method may be considered where the vehicles, which are in the same lane and equipped with the same system, are detected by detecting the absolute position of each of the vehicles by GPS (Global Positioning System) and transmitting the absolute position to each other by an inter-vehicle communication between the vehicles. However, in the GPS, the margin of error in a position measured independently may be as large as 30 to 100 m, such that it may be difficult to realize position measurement with the margin of error within 5 m that is necessary to recognize the lane in which the vehicles are travelling. As described above, in the method of the related art, in a road having two more lanes, it is difficult to detect the vehicles, which are in the same lane and equipped with the same system.

The present invention has been made in consideration of the above-described circumstance, and an object is to provide a vehicle control device, a vehicle control method, and a vehicle control system, which are capable of effectively suppressing traffic jams without being influenced by recognition accuracy of the lane in which a vehicle travels.

Solution to Problem

According to an aspect of the invention, there is provided a vehicle control device including a cooperating vehicle selecting unit that selects a separate vehicle traveling either ahead of or behind a host vehicle as a cooperating vehicle; and a traffic volume control unit that controls at least one of the distance between the cooperating vehicle that is selected by the cooperating vehicle selecting unit and the host vehicle, the relative speed of the cooperating vehicle and the host vehicle, and the speed of the cooperating vehicle and the host vehicle to control the traffic volume of a road in the vicinity of the cooperating vehicle and the host vehicle, wherein the cooperating vehicle selecting unit determines whether or not to select the separate vehicle as a cooperating vehicle based on the relative speed of the separate vehicle and the host vehicle.

According to this configuration, the cooperating vehicle selecting unit selects the separate vehicle traveling either ahead of or behind the host vehicle as a cooperating vehicle, and the traffic volume control unit controls the distance between the cooperating vehicle selected by the cooperating vehicle selecting unit and the host vehicle, or the like to control the traffic volume of the road in the vicinity of the cooperating vehicle and the host vehicle, such that it is possible to effectively suppress traffic jams as compared with a case where the host vehicle performs a travel control independently. In addition, the cooperating vehicle selecting unit determines whether or not to select the separate vehicle as a cooperating vehicle based on the relative speed of the separate vehicle and the host vehicle regardless of whether or not the separate vehicle that is selected as a cooperating vehicle is traveling in the same lane as the host vehicle, such that it is possible to select the cooperating vehicle without being influenced by accuracy of recognizing the lane in which the separate vehicle travels.

In this case, when the relative speed of the separate vehicle and the host vehicle is equal to or less than a predetermined threshold value, it is ideal for the cooperating vehicle selecting unit to select the separate vehicle as a cooperating vehicle.

According to this configuration, when the relative speed of the separate vehicle and the host vehicle is equal to or less than a predetermined threshold value, the cooperating vehicle selecting unit selects the separate vehicle as a cooperating vehicle, such that it is possible to select the separate vehicle, which has a low relative speed with respect to the host vehicle and forms the same vehicle group with the host vehicle, and thereby is easy to cooperate with the host vehicle, as a cooperating vehicle.

In addition, the cooperating vehicle selecting unit may select a separate vehicle, which is closest to the host vehicle among the separate vehicles traveling either ahead of or behind the host vehicle, as a cooperating vehicle.

According to this configuration, the cooperating vehicle selecting unit selects a separate vehicle, which is closest to the host vehicle among the separate vehicles traveling either ahead of or behind the host vehicle, as a cooperating vehicle, such that it is possible to select the separate vehicle, which is close to the host vehicle and forms the same vehicle group with the host vehicle, and thereby is easy to cooperate with the host vehicle, as a cooperating vehicle.

In addition, the cooperating vehicle selecting unit may select each of the separate vehicles traveling ahead of and behind the host vehicle as a cooperating vehicle, and the traffic volume control unit may control at least one of the distance between each of the cooperating vehicles selected by the cooperating vehicle selecting unit and the host vehicle, the relative speed of each of the cooperating vehicles and the host vehicle, and the speed of each of the cooperating vehicles and the host vehicle to control the traffic volume of a road in the vicinity of each of the cooperating vehicles and the host vehicle.

According to this configuration, the cooperating vehicle selecting unit selects each of the separate vehicles traveling ahead of and behind the host vehicle as cooperating vehicles, and the traffic volume control unit controls the distance between each of the cooperating vehicles selected by the cooperating vehicle selecting unit and the host vehicle, or the like to control the traffic volume of the road in the vicinity of each of the cooperating vehicles and the host vehicle, such that for example, even when the host vehicle does not travel in the same lane as the separate vehicles traveling ahead of and behind the host vehicle, the separate vehicles traveling ahead of and behind the host vehicle may be traveling in the same lane as each other, and in this case, the separate vehicles traveling ahead of and behind the host vehicle indirectly control the inter-vehicle distance or the like with each other. Therefore, it is possible to effectively suppress traffic jams without being influenced by the lane in which the host vehicle and the separate vehicles travel.

In this case, each of the cooperating vehicles selected by the cooperating vehicle selecting unit may be any one of n or more separate vehicles that sequentially cooperate with each other among vehicles traveling either ahead of or behind the host vehicle with respect to the number of lanes n of the road on which the host vehicle travels, and in regard to the n or more separate vehicles that cooperate with each other, at least one of the distance between the separate vehicles, the relative speed of the separate vehicles, and the speed of the separate vehicles may be controlled to control the traffic volume of a road in the vicinity of the separate vehicles.

According to this configuration, each of the cooperating vehicles selected by the cooperating vehicle selecting unit is any one of n or more separate vehicles that sequentially cooperate with each other among vehicles traveling either ahead of or behind the host vehicle with respect to the number of lanes n of the road on which the host vehicle travels, and in regard to the n or more separate vehicles that cooperate with each other, the distance between the separate vehicles, or the like is controlled to control the traffic volume of a road in the vicinity of the separate vehicles, such that n+1 vehicles including the host vehicle, which cooperate with each other, travel on the road having the number of lanes n. Therefore, in at least one lane, two vehicles cooperate with each other in the same lane and the inter-vehicle distance or the like is controlled, such that it is possible to suppress traffic jams more effectively without being influenced by the lane in which the host vehicle and the separate vehicles travel.

In addition, the cooperating vehicle selecting unit may determine whether or not to select the separate vehicle as a cooperating vehicle based on either an acceleration and deceleration history of the separate vehicle or a lane change history of the separate vehicle.

According to this configuration, the cooperating vehicle selecting unit determines whether or not to select the separate vehicle as a cooperating vehicle based on either an acceleration and deceleration history of the separate vehicle or a lane change history of the separate vehicle, such that even though the separate vehicle is a vehicle that can cooperate, it is possible to select a separate vehicle that has an acceleration and deceleration tendency or a lane change tendency by the driving operations of a driver, which is appropriate for the cooperation, as a cooperating vehicle.

In this case, when either the number of accelerations and decelerations of the separate vehicle within a predetermined time or the number of lane changes of the separate vehicle within a predetermined time is equal to or larger than a predetermined threshold value, the cooperating vehicle selecting unit may not select the separate vehicle as a cooperating vehicle.

According to this configuration, when either the number of accelerations and decelerations of the separate vehicle within a predetermined time or the number of lane changes of the separate vehicle within a predetermined time is equal to or larger than a predetermined threshold value, the cooperating vehicle selecting unit does not select the separate vehicle as a cooperating vehicle, such that a separate vehicle in which the number of accelerations and decelerations or the number of lane changes is large and which may obstruct the cooperation due to an unnecessary driving operation by a driver is excluded, and thereby it is possible to select a separate vehicle that can more reliably cooperate as a cooperating vehicle.

On the other hand, according to another aspect of the invention, there is provided a vehicle control method including a cooperating vehicle selection process of selecting a separate vehicle traveling either ahead of or behind a host vehicle as a cooperating vehicle; and a traffic volume control process of controlling at least one of the distance between the cooperating vehicle that is selected by the cooperating vehicle selecting unit and the host vehicle, the relative speed of the cooperating vehicle and the host vehicle, and the speed of the cooperating vehicle and the host vehicle to control the traffic volume of a road in the vicinity of the cooperating vehicle and the host vehicle, wherein in the cooperating vehicle selection process, it is determined whether or not to select the separate vehicle as a cooperating vehicle based on the relative speed of the separate vehicle and the host vehicle.

In this case, when the relative speed of the separate vehicle and the host vehicle is equal to or less than a predetermined threshold value in the cooperating vehicle selection process, the separate vehicle may be selected as a cooperating vehicle.

In addition, in the cooperating vehicle selection process, a separate vehicle, which is closest to the host vehicle among the separate vehicles traveling either ahead of or behind the host vehicle, may be selected as a cooperating vehicle.

In addition, in the cooperating vehicle selection process, each of the separate vehicles traveling ahead of and behind the host vehicle may be selected as a cooperating vehicle, and in the traffic volume control process, at least one of the distance between each of the cooperating vehicles selected by the cooperating vehicle selecting unit and the host vehicle, the relative speed of each of the cooperating vehicles and the host vehicle, and the speed of each of the cooperating vehicles and the host vehicle may be controlled to control the traffic volume of a road in the vicinity of each of the cooperating vehicles and the host vehicle.

In this case, each of the cooperating vehicles selected in the cooperating vehicle selection process may be any one of n or more separate vehicles that sequentially cooperate with each other among vehicles traveling either ahead of or behind the host vehicle with respect to the number of lanes n of the road on which the host vehicle travels, and in regard to the n or more separate vehicles that cooperate with each other, any one of the distance between the separate vehicles, the relative speed of the separate vehicles, and the speed of the separate vehicles may be controlled to control the traffic volume of a road in the vicinity of the separate vehicles.

In addition, in the cooperating vehicle selection process, it may be determined whether or not to select the separate vehicle as a cooperating vehicle based on either an acceleration and deceleration history of the separate vehicle or a lane change history of the separate vehicle.

In this case, when either the number of accelerations and decelerations of the separate vehicle within a predetermined time or the number of lane changes of the separate vehicle within a predetermined time is equal to or larger than a predetermined threshold value, in the cooperating vehicle selection process, the separate vehicle may be not selected as a cooperating vehicle.

On the other hand, according to still another aspect of the invention, there is provided a vehicle control system including a cooperating vehicle selecting unit that selects a separate vehicle traveling either ahead of or behind one vehicle as a cooperating vehicle; and a traffic volume control unit that controls at least one of the distance between the cooperating vehicle that is selected by the cooperating vehicle selecting unit and the one vehicle, the relative speed of the cooperating vehicle and the one vehicle, and the speed of the cooperating vehicle and the one vehicle to control the traffic volume of a road in the vicinity of the cooperating vehicle and the one vehicle, wherein the cooperating vehicle selecting unit determines whether or not to select the separate vehicle as a cooperating vehicle based on the relative speed of the separate vehicle and the one vehicle.

In this case, when the relative speed of the separate vehicle and the one vehicle is equal to or less than a predetermined threshold value, the cooperating vehicle selecting unit may select the separate vehicle as a cooperating vehicle.

In addition, the cooperating vehicle selecting unit may select a separate vehicle, which is closest to the one vehicle among the separate vehicles traveling either ahead of or behind the one vehicle, as a cooperating vehicle.

In addition, the cooperating vehicle selecting unit may select each of the separate vehicles traveling ahead of and behind the one vehicle as a cooperating vehicle, and the traffic volume control unit may control at least one of the distance between each of the typical vehicles selected by the cooperating vehicle selecting unit and the one vehicle, the relative speed of each of the cooperating vehicles and the one vehicle, and the speed of each of the cooperating vehicles and the vehicle of the position to control the traffic volume of a road in the vicinity of each of the cooperating vehicles and the position.

In this case, wherein each of the cooperating vehicles selected by the cooperating vehicle selecting unit may be any one of n or more separate vehicles that sequentially cooperate with each other among vehicles traveling either ahead of or behind the host vehicle with respect to the number of lanes n of the road on which the one vehicle travels, and the traffic volume control unit may control any one of the distance between the separate vehicles, the relative speed of the separate vehicles, and the speed of the separate vehicles with respect to the n or more separate vehicles that cooperate with each other to control the traffic volume of a road in the vicinity of the separate vehicles.

In addition, the cooperating vehicle selecting unit may determine whether or not to select the separate vehicle as a cooperating vehicle based on either an acceleration and deceleration history of the separate vehicle or a lane change history of the separate vehicle.

In this case, when either the number of accelerations and decelerations of the separate vehicle within a predetermined time or the number of lane changes of the separate vehicle within a predetermined time is equal to or larger than a predetermined threshold value, the cooperating vehicle selecting unit may not select the separate vehicle as a cooperating vehicle.

Advantageous Effects of Invention

According to the vehicle control device, the vehicle control method, and the vehicle control system of the invention, it is possible to effectively suppress traffic jams without being influenced by recognition accuracy of the lane in which a vehicle travels.

DESCRIPTION OF EMBODIMENTS

Figure 1:
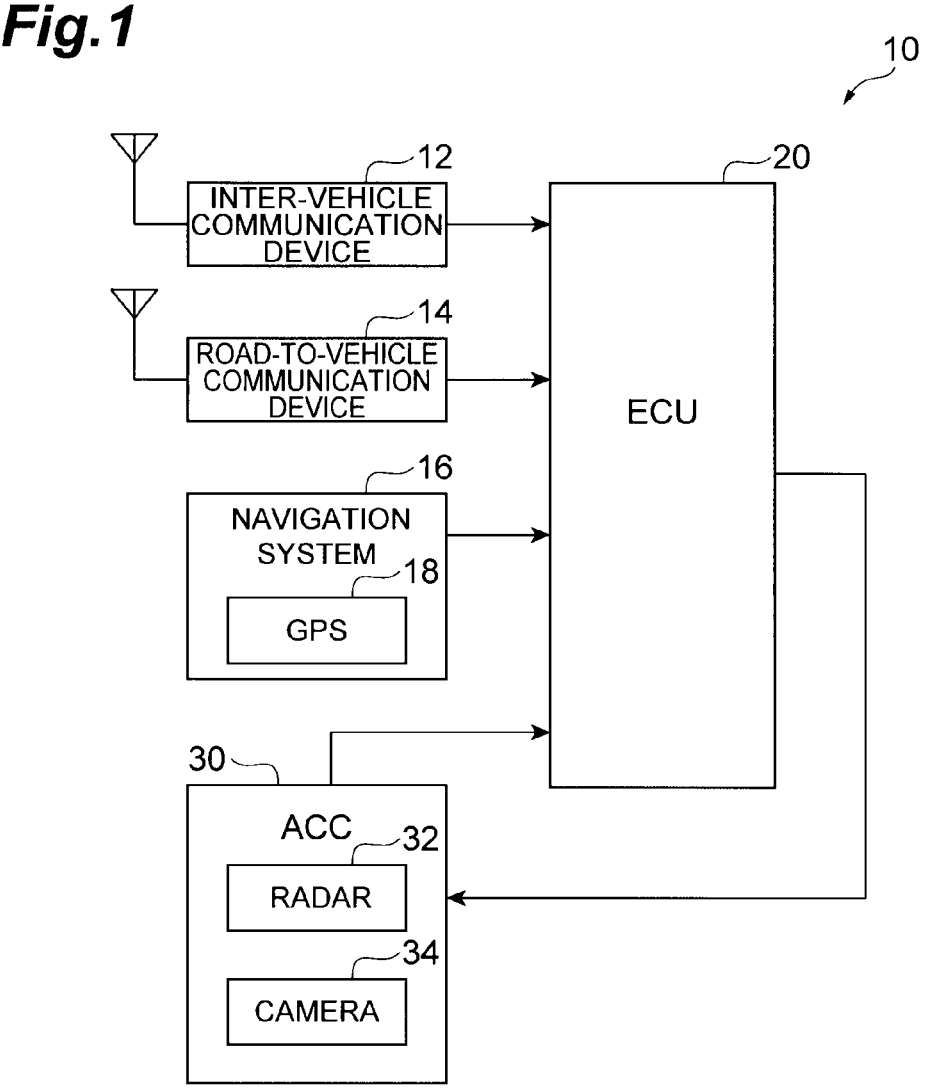
FIG. 1 is a block diagram illustrating a configuration of a vehicle control device according to a first embodiment.

Hereinafter, a vehicle control device according to an embodiment of the invention will be described with reference to the accompanying drawings. The vehicle control device of the present embodiment is a device that is mounted on a vehicle to perform a vehicle control to improve the traffic volume of a road. As shown in FIG. 1, the vehicle control device 10 of this embodiment includes an inter-vehicle communication device 12, a road-to-vehicle communication device 14, a navigation system 16, an ECU (Electronic Control Unit) 20, and an ACC (Adaptive Cruise Control) 30.

The inter-vehicle communication device 12 transmits and receives information indicating a position or the speed of a system-mounted vehicle other than a host vehicle, or whether or not a vehicle mounted control device of this embodiment, which prevents traffic jams, is mounted, through inter-vehicle communication.

The road-to-vehicle communication device 14 receives information such as the traffic volume of a road, the position of a vehicle traveling on the road, and the vehicle speed from a road-side facility such as an optical beacon communication device. In addition, in this embodiment, the road-to-vehicle communication device 14 is not necessarily a requisite construction.

The navigation system 16 includes a GPS 18 that receives a signal from a plurality of GPS sanitation using a GPS receiver, and measures the position of the host vehicle from a difference in respective signals, a map information DB (Data Base) (not shown) in the host vehicle, which stores map information, and a wheel speed sensor (not shown) that measures the speed of the host vehicle. The navigation system 16 acquires the absolute position of the host vehicle, the speed of the host vehicle, or information related to a position such as a sag causing a decrease in vehicle speed in front of the host vehicle, in addition to performing a course guide. For example, the navigation system 16 detects the absolute position of the host vehicle, the speed, or the relative position with respect to the sag, and outputs this to the ECU 20.

Information about the absolute position of the host vehicle from the navigation system 16 or information about the relative position with respect to the sag, information about a position or the speed of a separate vehicle in the vicinity of the host vehicle from the inter-vehicle communication device 12, or information about a position or the speed of a separate vehicle in the vicinity of the host vehicle or information about the lane in which the host vehicle travels, which are transmitted from the ACC 30, is input to the ECU 20. In addition, the ECU outputs a travel control instruction value such as a target vehicle speed, acceleration and deceleration G, and a target inter-vehicle distance to the ACC 30 on the basis of the information input from the navigation system 16, the inter-vehicle communication device 12, or the ACC 30.

The ACC 30 includes a radar 32 that detects the relative position and the relative speed of a separate vehicle in the vicinity of the host vehicle. In addition, the ACC 30 includes a camera 34 that recognizes a white line of the lane in which the host vehicle travels. In addition, the ACC 30 performs a travel control on the basis of the travel control instruction value transmitted from the ECU 20 in such a manner that the target vehicle speed of the host vehicle, the acceleration and deceleration G, and the target inter-vehicle distance are obtained. In addition, in this embodiment, the radar 32 or the camera 34 are not necessarily a requisite construction.

Figure 2:
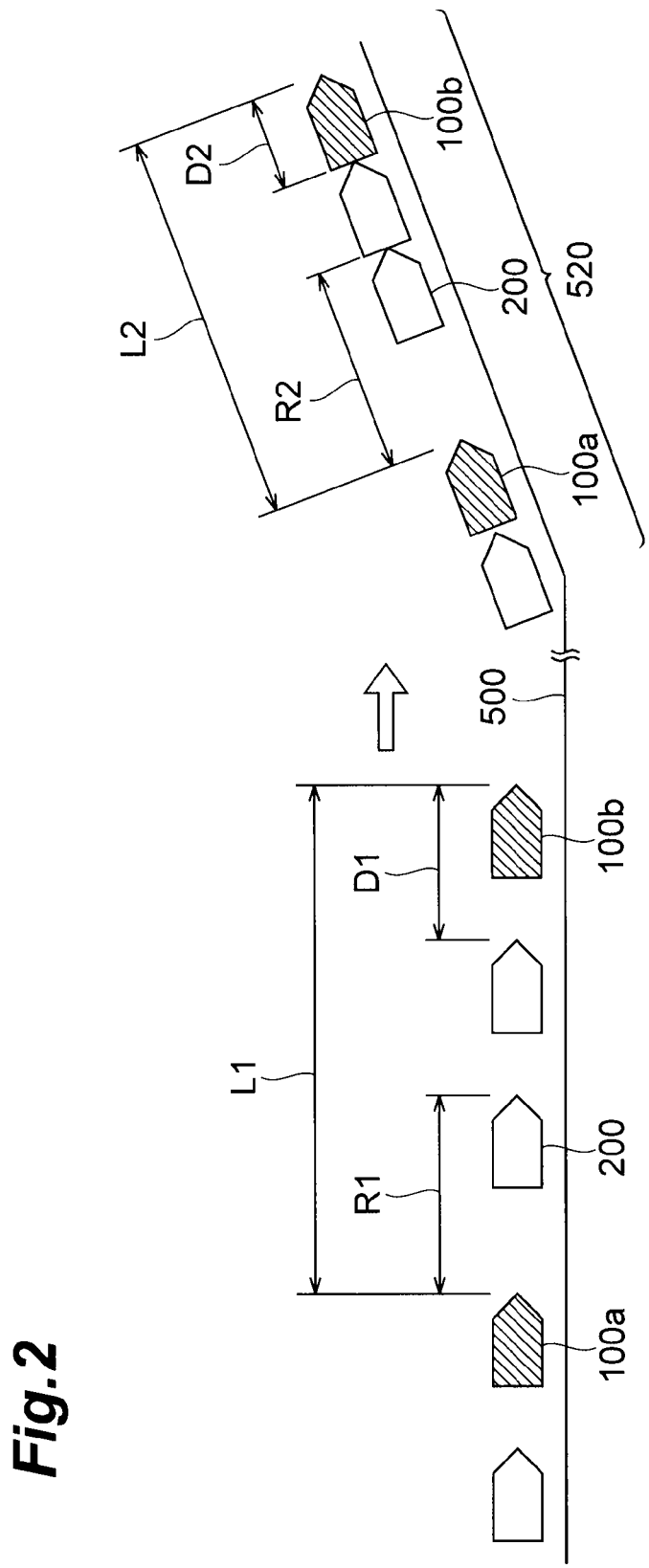
FIG. 2 is a side elevation view illustrating an example of a basic situation to which the vehicle control device of the first embodiment is applied.

Hereinafter, an operation of the vehicle control device 10 of this embodiment will be described. First, an operation in a basic situation where cooperating vehicles travel in the same lane will be described. As shown in FIG. 2, it is assumed that two system-mounted vehicles 100a and 100b on which the vehicle control device 10 of this embodiment is mounted travel in the same lane of a road 500. A plurality of ordinary vehicles 200 on which the vehicle control device 10 of this embodiment is not mounted travel ahead of or behind each of the system-mounted vehicles 100a and 100b. In such a situation, when the system-mounted vehicles 100a and 100b and the ordinary vehicles 200 reach an uphill 520, it is expected that the speed decreases and therefore traffic jams occurs.

First, the ECU 20 of the vehicle control device 10 mounted on the system-mounted vehicles 100a and 100b acquires information about the traffic volume of the road 500 from a traffic monitoring system on a road or the like through the road-to-vehicle communication device 14 (S101). In addition, the ECU 20 detects a distance to the uphill 520 by the road-to-vehicle communication device 14 or the navigation system 16 (S101). When the traffic volume is equal to or less than a predetermined threshold value (S102), the ECU 20 stops the control (S103).

When the traffic volume exceeds the predetermined threshold value (S102), the ECU 20 of the system-mounted vehicles 100a and 100b detects the position of the host vehicle, the lane in which the host vehicle travels, and the speed thereof by a position measuring sensor such as the GPS 18 or the wheel speed sensor of the navigation system 16, or the camera 34 of the ACC 30 (S104a).

Each of the system-mounted vehicles 100a and 100b transmits and receives information about the position of the host vehicle, the lane in which the host vehicle travels, and the speed thereof, which are detected, to and from each other through the inter-vehicle communication device 12 (S104b). The system-mounted vehicles 100a and 100b traveling in the same lane of the road 500 recognize each other as cooperating vehicles (S104c).

The ECU 20 of any one of the system-mounted vehicles 100a and 100b estimates the number X of ordinary vehicles 200 located between the system-mounted vehicles 100a and 100b, and a mean inter-vehicle distance (distance between the front of vehicles) D1 between the ordinary vehicles 200. In regard to the number X of vehicles and the mean inter-vehicle distance D1, the ECU 20 may receive values that are directly measured by the monitoring system on a road through the road-to-vehicle communication device 14.

Figure 5:
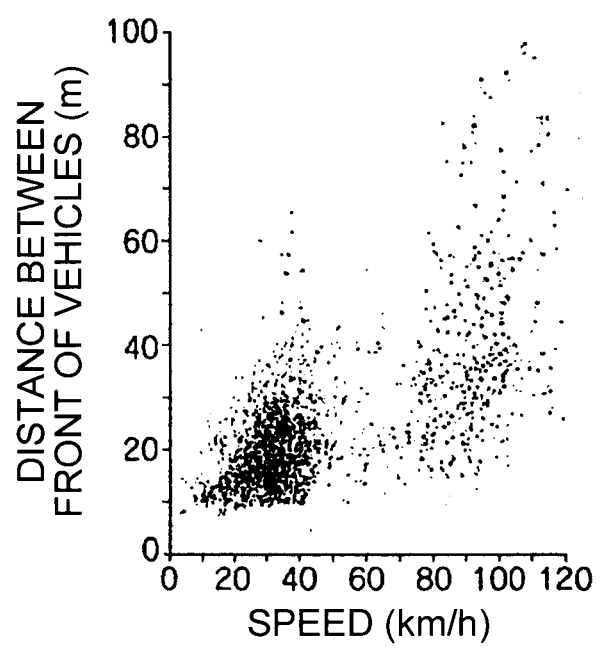
FIG. 5 is a graph illustrating a relationship between speed and the distance between the front of the vehicles.

In addition, when estimating the number X of vehicles and the mean inter-vehicle distance D1, the ECU 20 assumes that the inter-vehicle distances are most compressed at the current vehicle speed V1 of the system-mounted vehicle 100a, and may estimate a value of the shortest inter-vehicle distance at the vehicle speed V1 as the mean inter-vehicle distance D1, from statistical values of a relationship between a speed and the inter-vehicle distance as shown in FIG. 5. The ECU 20 may estimate the number X of vehicles by dividing the inter-vehicle distance (distance between the front of vehicles) L1 between the system-mounted vehicles 100a and 100b, which is acquired by the road-to-vehicle communication device 14, by the mean inter-vehicle distance D1.

Figure 4:
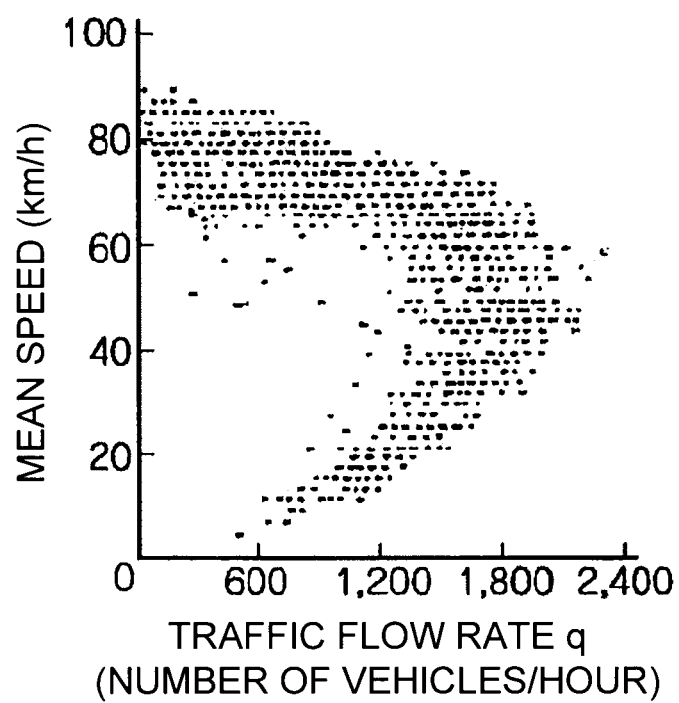
FIG. 4 is a graph illustrating a relationship of traffic flow rate and average speed.

The ECU 20 obtains a target speed V2, and the inter-vehicle distance (distance between the front of vehicles) R1 between the system-mounted vehicle 100a and an immediately preceding ordinary vehicle 200. The ECU 20 sets a speed at which a traffic flow rate becomes the highest, for example, 60 km/h as the target speed V2, from statistical values of a relationship between speed (km/h) and traffic flow rate (the number of vehicles/hour) as shown in FIG. 4. The ECU 20 obtains a target inter-vehicle distance (distance between the front of the vehicles) R2 between the system-mounted vehicle 100a and an immediately preceding ordinary vehicle 200. The ECU 20 sets the inter-vehicle distance at which deceleration of the immediately preceding ordinary vehicle 200 is not propagated to the system-mounted vehicle 100a as a target inter-vehicle distance R2. The ECU 20 may set 60 m, which is generally necessary for an inter-vehicle distance at which the deceleration of a preceding vehicle at the target speed V2 of 60 km/h, is not propagated, as the target inter-vehicle distance R2.

The ECU 20 may obtain a target inter-vehicle distance (distance between vehicles heads) L2 between the system-mounted vehicles 100a and 100b at the uphill 520 from a relationship of L2=X·D2+R2. The system-mounted vehicles 100a and 100b transmit and receive respective current positions, respective speeds V1, respective target positions, and respective target speeds V2 that are calculated as described above, to and from each other using the inter-vehicle communication device 12. Each ECU 20 calculates deceleration G and a deceleration initiation position that are capable of realizing the target speed V2 and the target inter-vehicle distance L2 between the system-mounted vehicles 100a and 100b at the uphill 520 (S105).

When a current speed is lower than the target speed V2 by a value exceeding a predetermined threshold value (S106), each ECU 20 of the system-mounted vehicles 100a and 100b determines that the deceleration is impossible, and stops the control (S107). When the current speed is lower than the target speed V2 by a value not exceeding the predetermined threshold value (S106) and the system-mounted vehicles 100a and 100b reach the calculated deceleration initiation position (S108), the ECU 20 allows the ACC 30 to perform the deceleration to the calculated deceleration G (S109). When the current speed reaches the target speed V2, and the inter-vehicle distance between the system-mounted vehicles 100a and 100b reaches the target inter-vehicle distance L2 (S110), the ECU 20 terminates the process.

In addition, the values calculated as described above, for example, the target speed V2 of the system-mounted vehicle 100a, the target inter-vehicle distance L2, the deceleration G, and the deceleration initiation position, or the like, are necessary for controlling still further following system-mounted vehicles (not shown), such that these values are transmitted to the system-mounted vehicles through the inter-vehicle communication device 12. Through the process as described above, such things as between vehicles of the system-mounted vehicles 100a and 100b or the like, which travel in the same lane are sequentially controlled, and therefore it is possible to suppress the occurrence of traffic jams.

Figure 6:
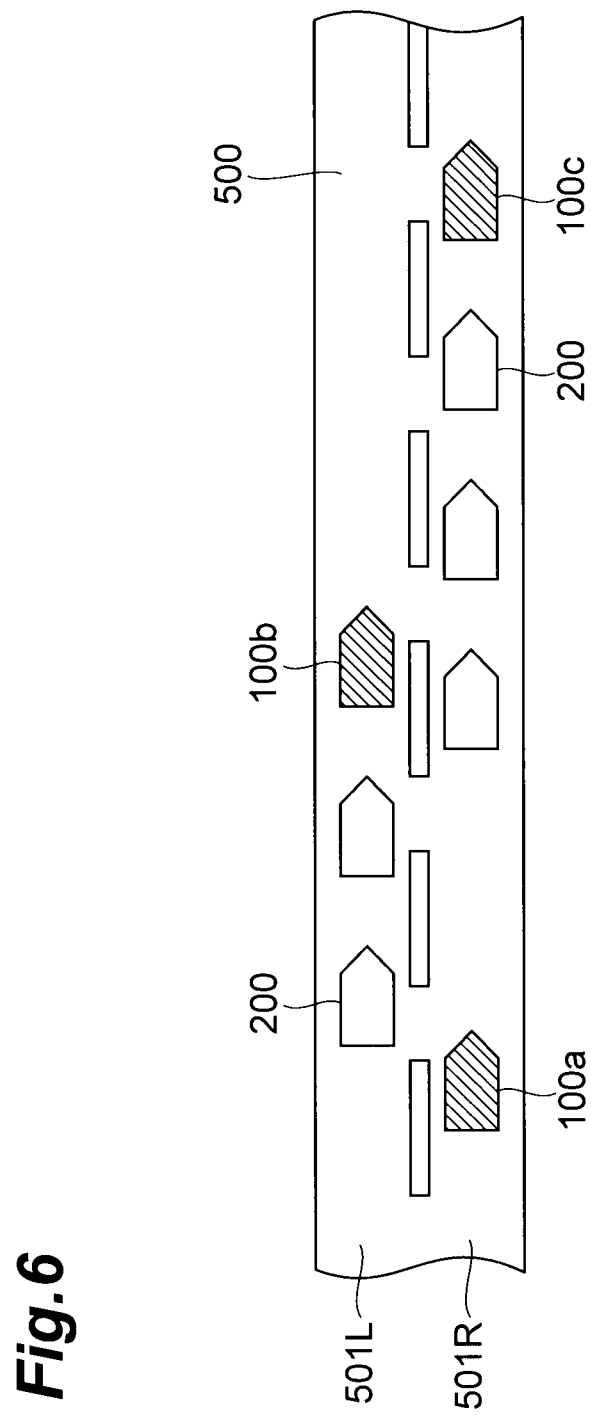
FIG. 6 is a plan view illustrating an example of a general situation to which the vehicle control device of the first embodiment is applied.

Next, an operation in a general situation where the cooperating vehicles travel in lanes different from each other will be described. As shown in FIG. 6, it is assumed that three system-mounted vehicles 100a to 100c on which the vehicle control device 10 of this embodiment is mounted travel on a road 500 having a left lane 501L and a right lane 501R. The system-mounted vehicle 100b traveling in the left lane 501L travels ahead of the system-mounted vehicle 100a traveling in the right lane 501R. The system-mounted vehicle 100c traveling in the right lane 501R travels ahead of the system-mounted vehicle 100b. A plurality of ordinary vehicles 200 on which the vehicle control device 10 of this embodiment is not mounted travels ahead of or behind each of the system-mounted vehicles 100a to 100c.

Figure 3:
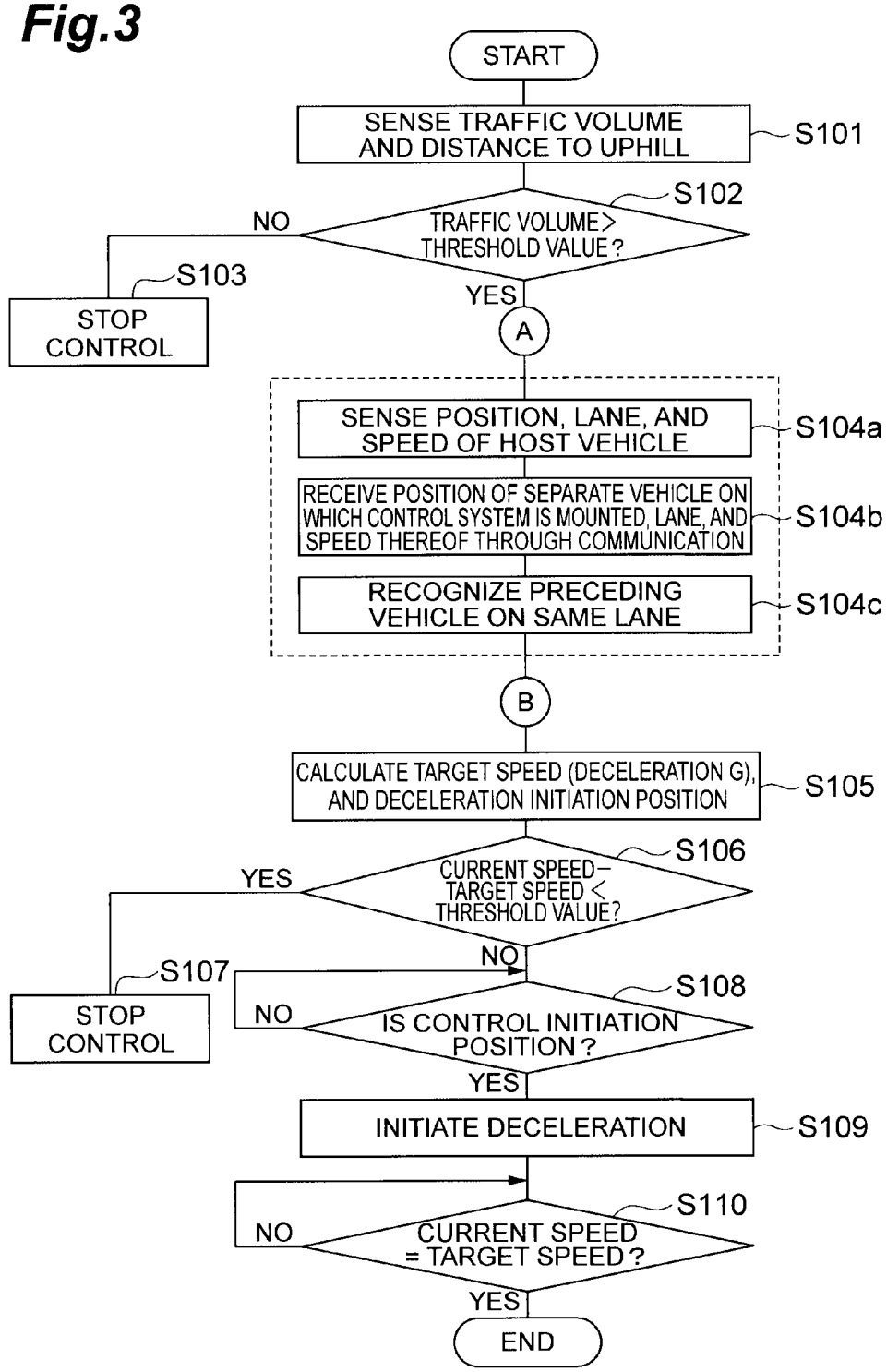
FIG. 3 is a flowchart illustrating a basic operation of the vehicle control device of the first embodiment.
Figure 7:
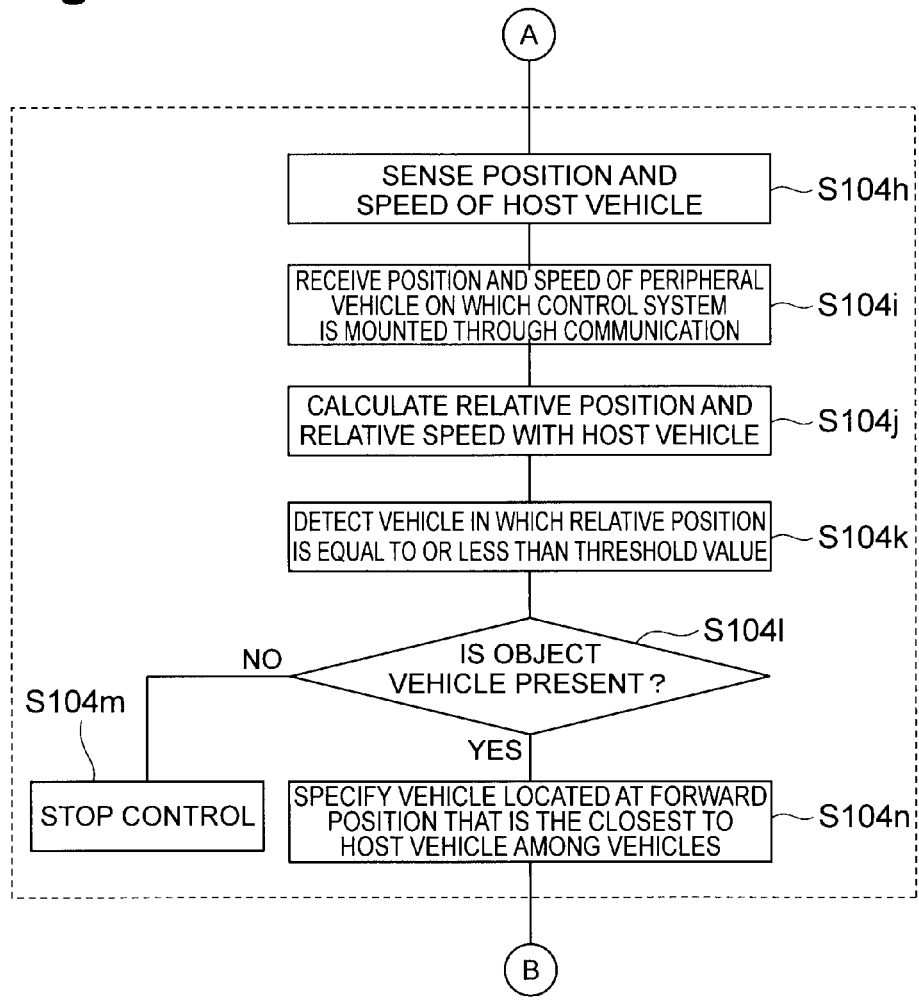
FIG. 7 is a flowchart illustrating a general operation of the vehicle control device of the first embodiment.

The ECU 20 of each of the system-mounted vehicles 100a to 100c performs the process of S101 to S103 of FIG. 3. As shown in FIG. 7, the ECU 20 of the system-mounted vehicles 100a to 100c detects the position of the host vehicle, the lane in which the host vehicle travels, and a speed thereof by a position measuring sensor such as the GPS 18 or the wheel speed sensor of the navigation system 16, or the camera 34 of the ACC 30 (S104h). In a situation shown in FIG. 6, each of the closest system-mounted vehicles 100a and 100b, and each of the closest system-mounted vehicles 100b and 100c are travelling in different lanes, but the positional accuracy of these system-mounted vehicles 100a to 100c may be of a degree that is able to determine a forward and backward relationship of the system-mounted vehicles 100a to 100c, and may not determine the lane in which each of the vehicles travels.

Each of the system-mounted vehicles 100a to 100c transmits and receives information about the position of the host vehicle, and the speed thereof to and from each other, which are detected, through the inter-vehicle communication device 12 (S104i). The ECU 20 of each of the system-mounted vehicles 100a to 100c detects the relative position (inter-vehicle distance) between a host vehicle and a separate system-mounted vehicle, and a relative speed from the received information (S104j).

The ECU 20 of each of the system-mounted vehicles 100a to 100c determines a system-mounted vehicle in which the relative speed is equal to or less than a threshold value (for example, 5 km/h) as a system-mounted vehicle belonging to the same vehicle group, and sets this system-mounted vehicle as a cooperating candidate (S104k and S104l). A plurality of vehicles may be detected as cooperating candidate vehicles. For example, in an example of FIG. 6, in regard to the system-mounted vehicle 100a, the system-mounted vehicles 100b and 100c are cooperating candidates, in regard to the system-mounted vehicle 100b, the system-mounted vehicles 100a and 100c are cooperating candidates, and in regard to the system-mounted vehicle 100c, the system-mounted vehicles 100a and 100b are cooperating candidates. When a system-mounted vehicle in which the relative speed is equal to or less than the threshold value is not present (S104l), each ECU 20 stops the control (S104m).

When the system-mounted vehicle in which the relative speed is equal to or less than the threshold value (S104l), the ECU 20 of each of the system-mounted vehicles 100a to 100c specifies a system-mounted vehicle, which is located at a forward position that is the closest to the host vehicle, as a cooperating vehicle (S104n). For example, in the example of FIG. 6, in regard to the system-mounted vehicle 100a, the system-mounted vehicle 100b is a cooperating vehicle, and in regard to the system-mounted vehicle 100b, the system-mounted vehicle 100c is a cooperating vehicle.

Then, as shown in S105 to S110 of FIG. 3, the inter-vehicle distance of the system-mounted vehicles 100a to 100c is adjusted through a deceleration control to suppress traffic jams at the sag or the uphill.

Figure 8:
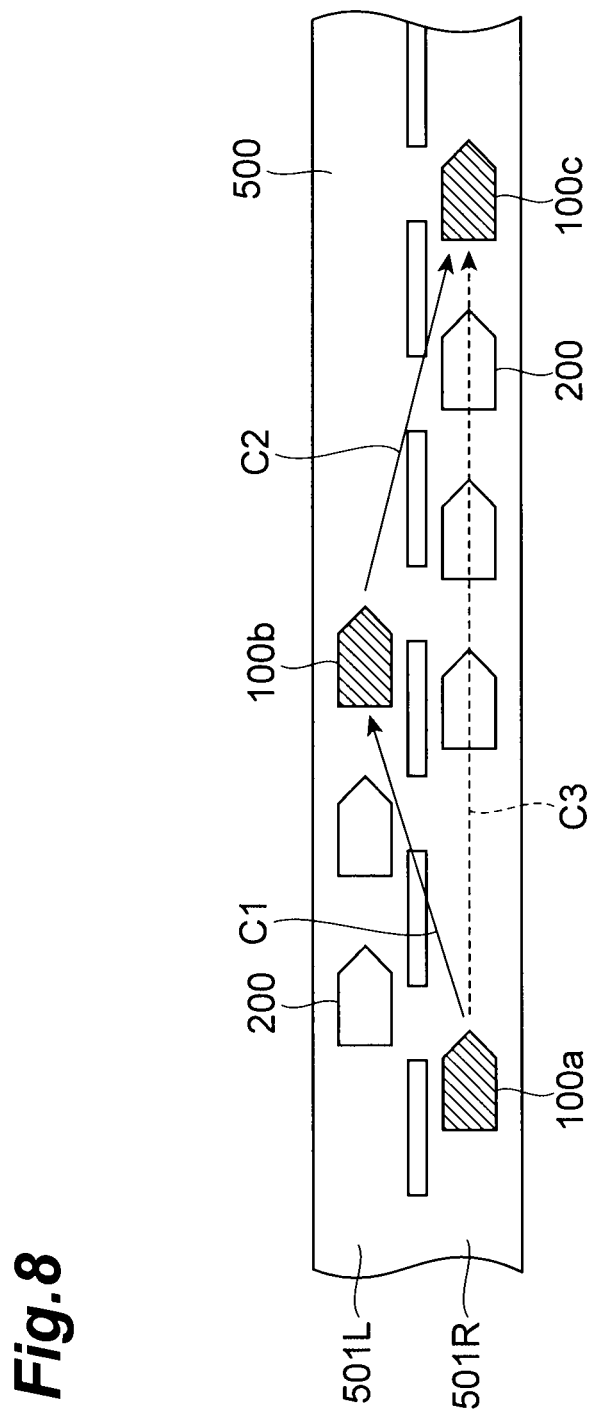
FIG. 8 is a plan view illustrating a control performed in the situation shown in FIG. 6.

In this embodiment, as shown in FIG. 8, a control C1 between the system-mounted vehicle 100a and the system-mounted vehicle 100b, and a control C2 between the system-mounted vehicle 100b and the system-mounted vehicle 100c are performed sequentially and successively in the forward direction or the backward direction in the same vehicle group. Through this control, even though the closest system-mounted vehicles travel in lanes different from each other, when a plurality of controls is performed between a plurality of system-mounted vehicles, the inter-vehicle distance between the system-mounted vehicles traveling in the same lane may be consequently controlled.

For example, in an example shown in FIG. 8, the system-mounted vehicle 100a, the system-mounted vehicle 100b, and the system-mounted vehicle 100b, and the system-mounted vehicle 100c travel in lanes different from each other, but when the controls C1 and C2 are performed twice, an indirect control C3 regarding the inter-vehicle distance between the system-mounted vehicles 100a and 100c may be performed. As a result, the inter-vehicle distances of the system-mounted vehicles 100a to 100c are controlled, respectively, and thereby the occurrence of traffic jams is suppressed.

In addition, in the case of FIG. 8, when it is assumed that only three system-mounted vehicles 100a to 100c are present in the same vehicle group, the inter-vehicle distance between the ordinary vehicles 200 ahead of and behind the system-mounted vehicle 100b is not controlled. However, a situation in which a system-mounted vehicle having a low relative speed is not present ahead of and behind the system-mounted vehicle 100b means that a large vehicle group is not formed ahead of and behind the system-mounted vehicle 100b. That is, there is a margin that the inter-vehicle distance may be extended to some degree ahead of and behind the system-mounted vehicle 100b. Therefore, in regard to the system-mounted vehicle 100b, it is difficult for traffic jams caused by deceleration propagation from preceding vehicles to occur at a sag or an uphill, such that it is considered that it is less necessary to perform the control ahead of and behind the system-mounted vehicle 100b.

In the example in FIG. 8, an example in which the road has two lanes is illustrated. However, even when the road has three or more lanes, in regard to the number of lanes n, when n system-mounted vehicles, and more preferably n+1 or more of system-mounted vehicles cooperate with each other in a forward and backward relationship, and adjacent system-mounted vehicles control the inter-vehicle distance, the speed, or the like, with each other, it is possible to obtain the same effect. For example, in regard to the number of lanes n, in a case where n+1 or more of system-mounted vehicles cooperate in a forward and backward relationship, two more system-mounted vehicles control the inter-vehicle distance, the speed, or the like, with each other, in at least one lane, and thereby even when the accuracy of detecting the lane in which the system-mounted vehicles travel is low, it has an effect of preventing traffic jams. In addition, in regard to the n lanes, when all of the system-mounted vehicles that are capable of cooperating with each other travel in lanes different from each other, since as described above, the situation in which a system-mounted vehicle having a low relative speed and being capable of cooperating is not present means that a large vehicle group is not formed ahead of and behind the system-mounted vehicle, therefore it is considered that it is less necessary to perform the control for preventing traffic jams with respect to the system-mounted vehicle.

In this embodiment, the ECU 20 of the vehicle control device 10 selects the system-mounted vehicle 100b traveling ahead of the system-mounted vehicle 100a as a cooperating vehicle, and controls the inter-vehicle distance L1 between the selected system-mounted vehicle 100b and the system-mounted vehicle 100a, or the like to control the traffic volume on a road in the vicinity of the system-mounted vehicles 100a and 100b, such that it is possible to effectively suppress traffic jams as compared with a case where the system-mounted vehicle 100a performs travel control independently. In addition, the ECU 20 determines whether or not to select the system-mounted vehicle 100b as a cooperating vehicle based on the relative speed of the system-mounted vehicle 100b and the system-mounted vehicle 100a regardless of whether or not the system-mounted vehicle 100b that is selected as a cooperating vehicle is traveling in the same lane as the system-mounted vehicle 100a, such that it is possible to select the cooperating system-mounted vehicle without being influenced by accuracy of recognizing the lane in which the system-mounted vehicle travels.

In addition, in this embodiment, when the relative speed between the system-mounted vehicle 100b and the system-mounted vehicle 100a is equal to or less than a predetermined threshold value, the ECU 20 selects the system-mounted vehicle 100b as a cooperating vehicle, such that it is possible to select the system-mounted vehicle 100b, which has a low relative speed with respect to the system-mounted vehicle 100a and forms the same vehicle group with the system-mounted vehicle 100a, and thereby is easy to cooperate with the system-mounted vehicle 100a, as a cooperating vehicle.

In addition, in this embodiment, the ECU 20 selects the system-mounted vehicle 100b that is closest to the system-mounted vehicle 100a between the system-mounted vehicles 100b and 100c traveling ahead of the system-mounted vehicle 100a as a cooperating vehicle, such that it is possible to select the system-mounted vehicle 100b, which is close to the system-mounted vehicle 100a and forms the same vehicle group with the system-mounted vehicle 100a, and thereby is easy to cooperate with the system-mounted vehicle 100a, as a cooperating vehicle.

In addition, in this embodiment, the ECU 20 selects each of the system-mounted vehicles 100a and 100c traveling ahead of and behind the system-mounted vehicle 100b as cooperating vehicles, and controls the distance between each of the selected system-mounted vehicles 100a and 100c and the system-mounted vehicle 100b, or the like to control the traffic volume of the road in the vicinity of the system-mounted vehicles 100a to 100c, such that, for example, even when the system-mounted vehicle 100b does not travel in the same lane as the system-mounted vehicles 100a and 100c traveling ahead of and behind the system-mounted vehicle 100b, the system-mounted vehicles 100a and 100c traveling ahead of and behind the system-mounted vehicle 100b may be traveling in the same lane as each other, and in this case, the system-mounted vehicles 100a and 100c indirectly control the inter-vehicle distance or the like with each other. Therefore, it is possible to effectively suppress traffic jams without being influenced by the lane in which the system-mounted vehicles 100a to 100c travel.

Figure 9:
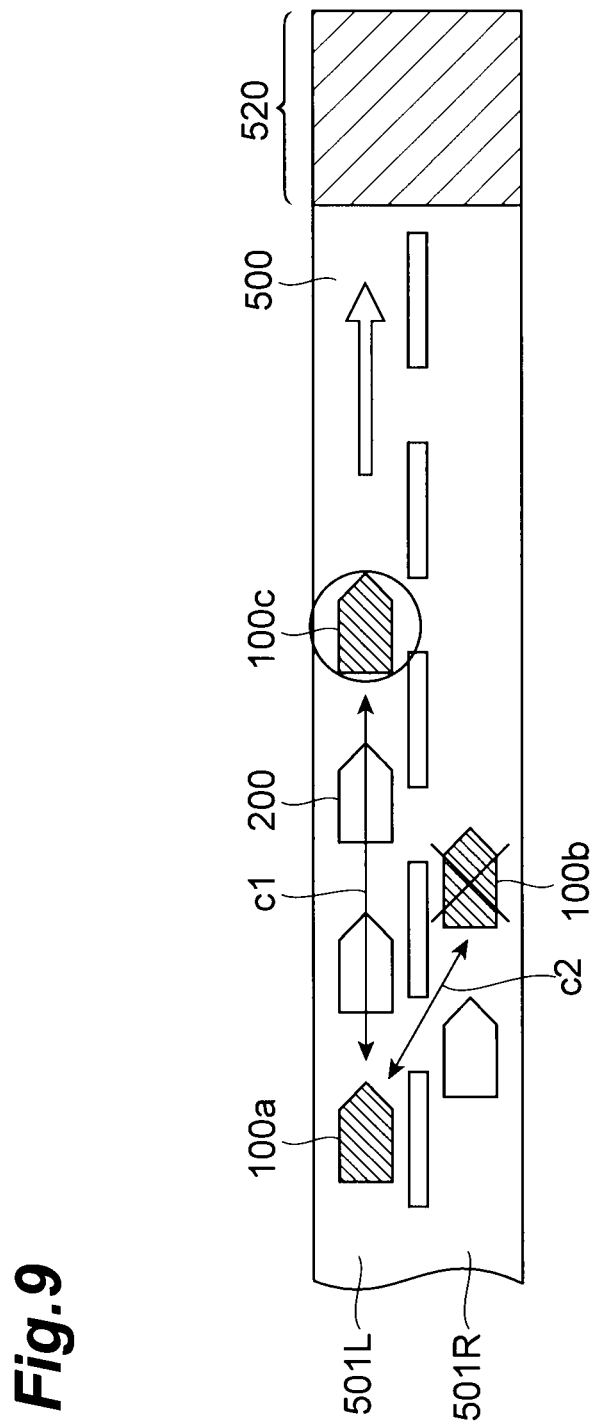
FIG. 9 is a plan view illustrating a problem in a device of the related art in a situation shown in FIG. 6.

That is, in the control of the related art in which the cooperating system-mounted vehicle is restricted to the vehicle traveling in the same lane, whether or not to perform the control is influenced by the accuracy of recognizing the lane in which the system-mounted vehicle travels. As shown in FIG. 9, in regard to a control c1 with respect to the system-mounted vehicle 100c traveling in the same lane as the system-mounted vehicle 100a, it is possible to suppress traffic jams, but in regard to a control c2 with respect to the system-mounted vehicle 100b traveling in a different lane, it may be difficult to suppress traffic jams. On the other hand, in this embodiment, it is determined whether or not to cooperate with separate vehicles traveling ahead of and behind the host vehicle, based on the relative speed of the separate vehicles and the host vehicle, regardless of whether or not the cooperating separate vehicles travel in the same lane as the host vehicle, and the cooperation with the separate vehicles traveling ahead of and behind the host vehicle is performed. In this embodiment, this cooperation is sequentially performed with respect to a plurality of vehicles, such that whether or not the cooperating vehicle travels in the same lane becomes unimportant, and therefore whether or not to perform the control is not influenced by the accuracy of recognizing the lane in which the system-mounted vehicle travels.

Particularly, in this embodiment, with respect to the number of lanes n of the road 500, n+1 or more of the system-mounted vehicles cooperate with each other, such that two more system-mounted vehicles control the inter-vehicle distance, the speed, or the like with each other on one lane or more. As a result, even when the accuracy of detecting the lane in which the system-mounted vehicles travel is low, there is an effect of preventing traffic jams.

Figure 10:
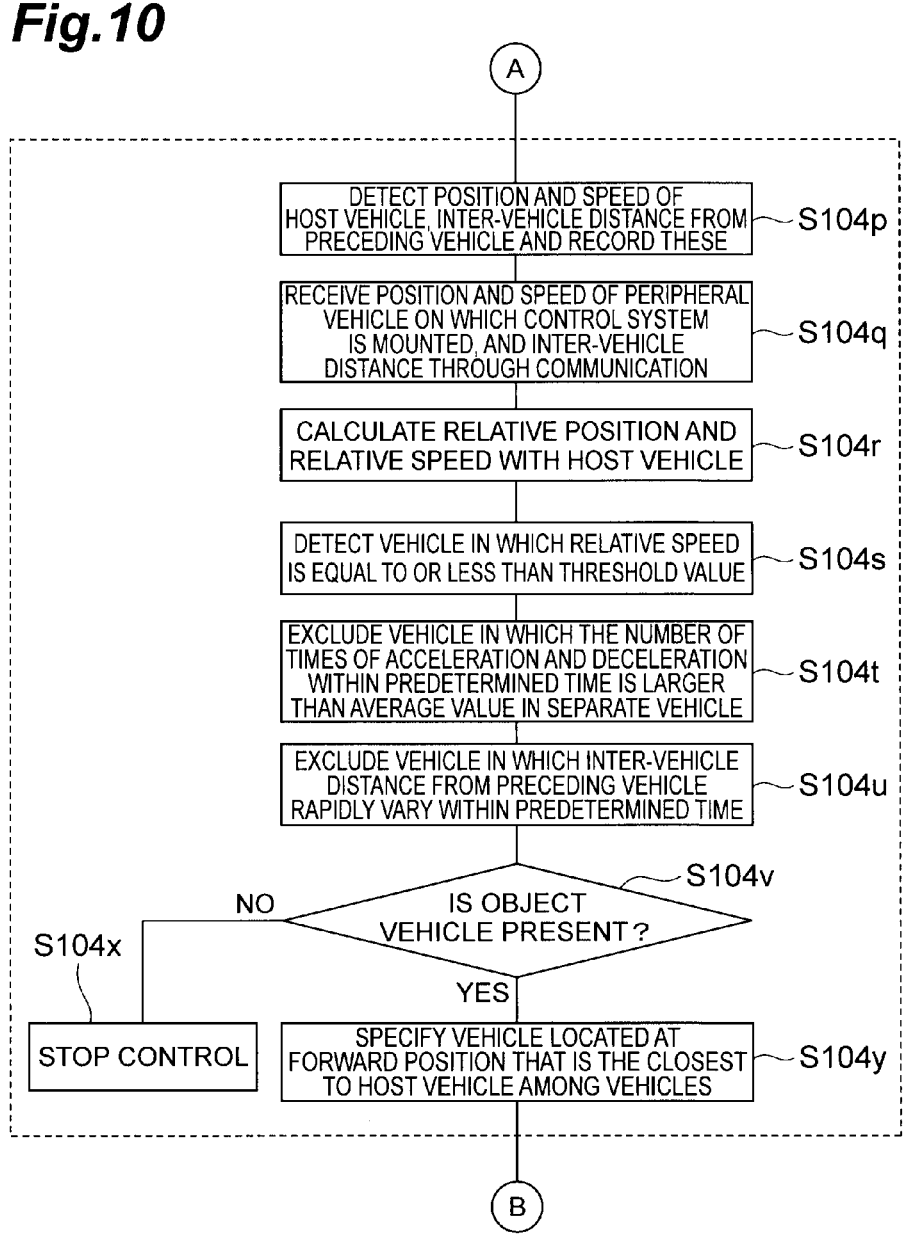
FIG. 10 is a flowchart illustrating a general operation of a vehicle control device of a second embodiment.

Hereinafter, a second embodiment of the invention will be described. In the above-described first embodiment, control is performed to lengthen the inter-vehicle distance ahead of the host vehicle or to decelerate, such that a driver of the system-mounted vehicle may feel uncomfortable with respect to this operation and therefore may perform a driving operation of shortening the inter-vehicle distance or acceleration Therefore, in this embodiment, an operation described below is performed. In a situation as shown in FIG. 6, the ECU 20 of each of the system-mounted vehicles 100a to 100c performs the process of S101 to S103 of FIG. 3. As shown in FIG. 10, the ECU 20 of the system-mounted vehicles 100a to 100c detects the position of the host vehicle, the lane in which the host vehicle travels, and a speed thereof by a position measuring sensor such as the GPS 18 or the wheel speed sensor of the navigation system 16, or the camera 34 of the ACC 30, detects the inter-vehicle distance from a preceding system-mounted vehicle by the radar 32 or the like for the prevention of contact with an obstacle, and records this data in a memory in the ECU 20 for a predetermined time (S104p).

Each of the system-mounted vehicles 100a to 100c transmits and receives information about the position and speed of the host vehicle, and the inter-vehicle distance, which are detected, to and from each other through the inter-vehicle communication device 12 (S104q). The ECU 20 of each of the system-mounted vehicles 100a to 100c detects the relative position (the inter-vehicle distance) and the relative speed of the host vehicle and the separate system-mounted vehicles from the received information (S104r).

The ECU 20 of each of the system-mounted vehicles 100a to 100c detects a system-mounted vehicle in which the relative speed is equal to or less than a threshold value (for example, 5 km/h), and sets this system-mounted vehicle as a candidate for the cooperating vehicle (S104s). Each ECU 20 counts the number of accelerations and decelerations of the system-mounted vehicle in which the relative speed is equal to or less than the threshold value within a predetermined time from the data recorded in S104p. Each ECU 20 determines that a vehicle in which the number of accelerations and decelerations within a predetermined time is larger than an average value in the separate vehicles by a predetermined threshold value or more, among the system-mounted vehicles in which the relative speed is equal to or less than a threshold value, is a vehicle in which a driver thereof does not follow the flow of a vehicle group, and excludes this vehicle from the candidates for cooperating vehicles (S104t).

In addition, the ECU 20 determines that a vehicle in which the inter-vehicle distance from the preceding vehicle rapidly varies performed a lane change. Each ECU 20 determines that from the data recorded in S104p, a vehicle in which the number of times in which the inter-vehicle distance from the preceding vehicle rapidly varies within a predetermined time, that is, the number of lane changes within a predetermined time is equal to or larger than a predetermined threshold value, as a vehicle where the driver does not go along the flow of a vehicle group, and excludes this vehicle from the candidates for cooperating vehicles (S104u).

In this manner, when a target system-mounted vehicle for cooperation is not present (S104v), each ECU 20 stops the control (S104x).

When a target system-mounted vehicle for cooperation is present (S104v), the ECU 20 of each of the system-mounted vehicles 100a to 100c specifies a system-mounted vehicle, which is located at a forward position that is closest to the host vehicle, as a cooperating vehicle (S104y). Then, as shown in S105 to S110 of FIG. 3, the inter-vehicle distance between the system-mounted vehicles 100a to 100c is adjusted through a deceleration control to suppress the occurrence of traffic jams at the sag or the uphill.

According to this embodiment, the ECU 20 determines whether or not to select the separate system-mounted vehicle as a cooperating vehicle based on the acceleration and deceleration history and the lane change history of the separate system-mounted vehicle, such that even though the system-mounted vehicle is a vehicle that can cooperate, it is possible to select a system-mounted vehicle that has an acceleration and deceleration tendency or a lane change tendency by a driving operation of a driver, which is appropriate for cooperation, as a cooperating vehicle.

Particularly, according to this embodiment, when the number of accelerations and decelerations and the number times of a lane change of a separate system-mounted vehicle within a predetermined time are equal to or larger than a predetermined threshold value, the ECU 20 does not select the separate system-mounted vehicle as a cooperating vehicle, such that a system-mounted vehicle in which the number of accelerations and decelerations or the number of lane changes is large and which may obstruct the cooperation due to an unnecessary driving operation by a driver is excluded, and thereby it is possible to select a system-mounted vehicle that can more reliably cooperate as a cooperating vehicle.

Hereinbefore, the embodiments of the invention have been described, but the invention is not limited to the above-described embodiments, and various modifications may be made. For example, in the above-described embodiments, the description is made with respect to an aspect in which the vehicle control device mounted on the individual system-mounted vehicles performs vehicle control for the prevention of traffic jams, but for example, the vehicle control device may be disposed only at a management center and instructions from the management center may be transmitted to the individual vehicles through a communication to perform the vehicle control for the prevention of traffic jams.

INDUSTRIAL APPLICABILITY

According to the vehicle control device, the vehicle control method, and the vehicle control system of the invention, it is possible to effectively suppress traffic jams without being influenced by the accuracy of recognizing the lane in which a vehicle travels.

REFERENCE SIGNS LIST

10: Vehicle control device
12: Inter-vehicle communication device
14: Road-to-vehicle communication device
16: Navigation system 18: GPS
20: ECU
30: ACC
32: Radar
34: Camera
100a to 100c: System-mounted vehicle
200: Ordinary vehicle
500: Road
501L: Left lane
501R: Right lane
520: Uphill

The invention claimed is:

1. A vehicle control device, comprising:
a controller configured to:
   select a separate vehicle traveling either ahead of or behind a host vehicle as a cooperating vehicle that travels in cooperation with the host vehicle;
   control at least one of a distance between the cooperating vehicle that is selected by the controller and the host vehicle, a relative speed of the cooperating vehicle and the host vehicle, and a speed of the cooperating vehicle and the host vehicle to control traffic volume of a road on which the cooperating vehicle and the host vehicle travel;
   determine whether or not to select the separate vehicle as the cooperating vehicle based on the relative speed of the separate vehicle and the host vehicle regardless of whether or not the separate vehicle is traveling in a same lane as the host vehicle and either an acceleration and deceleration history of the separate vehicle or a lane change history of the separate vehicle, wherein
when either the number of accelerations and decelerations of the separate vehicle within a predetermined time or the number of lane changes of the separate vehicle within a predetermined time is equal to or larger than a predetermined threshold value, the controller is configured to not select the separate vehicle as the cooperating vehicle.

2. A vehicle control method, comprising:
a cooperating vehicle selection process of selecting, via an electronic control unit (ECU), a separate vehicle traveling either ahead of or behind a host vehicle as a cooperating vehicle that travels in cooperation with the host vehicle; and
a traffic volume control process of controlling, via the ECU, at least one of a distance between the cooperating vehicle that is selected in the cooperating vehicle selection process and the host vehicle, a relative speed of the cooperating vehicle and the host vehicle, and a speed of the cooperating vehicle and the host vehicle to control traffic volume of a road on which the cooperating vehicle and the host vehicle travel,
wherein in the cooperating vehicle selection process,
it is determined whether or not to select the separate vehicle as the cooperating vehicle based on the relative speed of the separate vehicle and the host vehicle regardless of whether or not the separate vehicle is traveling in a same lane as the host vehicle and either an acceleration and deceleration history of the separate vehicle or a lane change history of the separate vehicle, and
when either the number of accelerations and decelerations of the separate vehicle within a predetermined time or the number of lane changes of the separate vehicle within a predetermined time is equal to or larger than a predetermined threshold value, the separate vehicle is not selected as the cooperating vehicle.

3. A vehicle control system, comprising:
circuitry configured to:
   select a separate vehicle traveling either ahead of or behind one vehicle as a cooperating vehicle that travels in cooperation with the one vehicle;
   control at least one of a distance between the cooperating vehicle that is selected by the circuitry and the one vehicle, a relative speed of the cooperating vehicle and the one vehicle, and a speed of the cooperating vehicle and the one vehicle to control traffic volume of a road on which the cooperating vehicle and the one vehicle travel;
   determine whether or not to select the separate vehicle as the cooperating vehicle based on the relative speed of the separate vehicle and the one vehicle regardless of whether or not the separate vehicle is traveling in a same lane as the one vehicle and either an acceleration and deceleration history of the separate vehicle or a lane change history of the separate vehicle, wherein
when either the number of accelerations and decelerations of the separate vehicle within a predetermined time or the number of lane changes of the separate vehicle within a predetermined time is equal to or larger than a predetermined threshold value, the circuitry is configured to not select the separate vehicle as the cooperating vehicle.

4. The vehicle control device according to claim 1,
wherein when the relative speed of the separate vehicle and the host vehicle is equal to or less than a predetermined threshold value, the controller is configured to select the separate vehicle as the cooperating vehicle.

5. The vehicle control device according to claim 1,
wherein the controller is configured to select a separate vehicle, which is closest to the host vehicle among the separate vehicles traveling either ahead of or behind the host vehicle, as the cooperating vehicle.

6. The vehicle control method according to claim 2,
wherein in the cooperating vehicle selection process, when the relative speed of the separate vehicle and the host vehicle is equal to or less than a predetermined threshold value, the separate vehicle is selected as the cooperating vehicle.

7. The vehicle control method according to claim 2,
wherein in the cooperating vehicle selection process, a separate vehicle, which is closest to the host vehicle among separate vehicles traveling either ahead of or behind the host vehicle, is selected as the cooperating vehicle.

8. The vehicle control system according to claim 3,
wherein when the relative speed of the separate vehicle and the one vehicle is equal to or less than a predetermined threshold value, the circuitry is configured to select the separate vehicle as the cooperating vehicle.

9. The vehicle control system according to claim 3,
wherein the circuitry is configured to select a separate vehicle, which is closest to the one vehicle among the separate vehicles traveling either ahead of or behind the one vehicle, as the cooperating vehicle.

* * * * *